US008009964B2

(12) United States Patent  (10) Patent No.: US 8,009,964 B2
Ishida et al.  (45) Date of Patent: Aug. 30, 2011

(54) LABEL CREATING APPARATUS AND LABEL CREATING PROGRAM RECORDED IN COMPUTER-READABLE RECORDING MEDIUM

(75) Inventors: Minako Ishida, Nagoya (JP); Hideo Ueno, Nagoya (JP); Takao Kato, Nagoya (JP); Naruhito Muto, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1435 days.

(21) Appl. No.: 11/483,492

(22) Filed: Jul. 10, 2006

(65) Prior Publication Data

US 2007/0016924 A1 Jan. 18, 2007

(30) Foreign Application Priority Data

Jul. 15, 2005 (JP) .................. 2005-206404

(51) Int. Cl.
*H04N 9/80* (2006.01)
*H04N 5/93* (2006.01)
*G11B 27/00* (2006.01)
*G11B 13/00* (2006.01)
*G11B 7/125* (2006.01)

(52) U.S. Cl. .......... 386/248; 386/239; 386/278; 369/14; 369/53.29

(58) Field of Classification Search ............. 386/46, 386/68, 95, 123–126, 248, 239, 278; 369/14, 369/53.29

See application file for complete search history.

(56) References Cited

U.S. PATENT DOCUMENTS

| 5,131,772 A * | 7/1992 | Yamaguchi ............ 400/621 |
| 2002/0191951 A1* | 12/2002 | Sodeyama et al. ........ 386/46 |
| 2004/0071454 A1* | 4/2004 | Nishizawa ............ 386/126 |
| 2004/0181815 A1* | 9/2004 | Hull et al. ............ 725/134 |
| 2005/0100322 A1 | 5/2005 | Kikuchi et al. |
| 2005/0147398 A1 | 7/2005 | Anderson et al. |
| 2005/0169115 A1 | 8/2005 | Nagano et al. |

FOREIGN PATENT DOCUMENTS

| JP | 11-086504 | 3/1999 |
| JP | 2003-046922 | 2/2003 |
| JP | 2003 134447 | 5/2003 |
| JP | 2004-130682 | 4/2004 |
| JP | 2004-214991 | 7/2004 |
| JP | 2005-110315 | 4/2005 |
| JP | 2005101996 | 4/2005 |
| JP | 2005182859 A | 7/2005 |

* cited by examiner

*Primary Examiner* — Thai Tran
*Assistant Examiner* — Daquan Zhao
(74) *Attorney, Agent, or Firm* — Day Pitney LLP

(57) ABSTRACT

For programs selected as those whose label is to be created, a list of available templates is displayed on a arrangement processing screen 200 together with contents of EPG information acquired from an EPG information DB. The EPG information is displayed on a left screen 210 and the templates list is displayed on a right screen 220, so that one template desired to be applied is selected on the right screen 220, according to which template, one or a plurality of the EPG information pieces whose label is desired to be created is selected on the left screen 210. Templates 230, 240, 250, and 260 constitute a label set comprised of a plurality of labels, thus enabling creating labels by incorporating information pieces of specified items.

12 Claims, 14 Drawing Sheets

FIG. 13

| PS |
|---|

| PS | "GOURMET ON MOUNTAIN AND SEA ? SPRING-"  APR. 27, 2005<br>"EAT ? SAKAE- "  APR. 17, 2005<br>"MASTER SUSHI"  APR. 10, 2005<br>"JAPANESE NOODLE MANIA"  APR. 3, 2005<br>"ALONG HIGASHIYAMA SUBWAY...."  MAR. 27, 2005 |
|---|---|
|  | TAKAYAMA JUNICHI, SHIBAYAMA RIE, KAYAMA HARUHIKO |

↙ 340

| PS |
|---|

| PS | "EAT ? MEIJOU- "  MAR. 20, 2005<br>NAGOYA IS HOT NOW!"  "  MAR. 13, 2005 |
|---|---|
|  | TAKAYAMA JUNICHI, SHIBAYAMA RIE, KAYAMA HARUHIKO |

↙ 350

LABEL CREATING APPARATUS AND LABEL CREATING PROGRAM RECORDED IN COMPUTER-READABLE RECORDING MEDIUM

This application claims priority from Japanese patent application serial number 2005-206404, filed Jul. 15, 2005, the contents of which are hereby incorporated by reference.

BACKGROUND OF THE INVENTION

1. Field of the Invention

The invention relates to a label creating apparatus and a label creating program recorded in a computer-readable recording medium.

2. Description of the Related Art

Recently, hard disk recorder and DVD recorders have been widely used to make it further easier to video-recording a broadcast program and enjoy viewing it. In video-recording a desired broadcast program, reservation can be made also by acquiring information of that broadcast program by using an electronic program guide (EPG). Such an EPG has been transmitted with the same surface wave as that for broadcast programs and also provided to the Internet. Recently personal computer equipped with a TV tuner have also been used widely, to make it more common to receive broadcast programs through the Internet and video-record them by using a TV set.

However, as video-recording can be performed very easily, a vast amount of information is video-recorded, so that unless various broadcast programs video-recorded on various recording media are rearranged, such a problem occurs that a desired one of the broadcast programs cannot be reached later, thus making it impossible to enjoy convenience. To solve this problem, a label creating (producing) apparatus has been proposed which prints a label upon occurrence of such an event as video-recording reservation or playback and attaching it to the corresponding video-recording medium (see, for example, Japanese Patent Application Laid Open Publication No. 2003-134447).

This conventional label creating apparatus prepares a template of labels adapted to a recording medium such as a VHS tape or an 8-mm tape and pours broadcast program information acquired from the EPG etc. into this template, thereby creating a label. Then, at a specified timing (at a video-recording reservation, video-recording completion, playback, etc.), the created label is printed.

However, this conventional label creating apparatus has not accommodated a case where it is desired to create a plurality of labels collectively as referencing the broadcast program information after video-recording is finished. In particular, in a case where it is desired to create one set of multiple labels by appropriately arranging such items as titles, subtitles, and dates into these labels, they cannot be done so at a time.

SUMMARY OF THE INVENTION

To solve these problems, the invention has been developed, and it is an object of the invention to provide a label creating apparatus for creating one set of multiple labels based on accumulated broadcast program information, a label creating program, and a recording medium.

To this end, a first aspect of the invention provides a label creating apparatus comprising a receiving device for receiving broadcast program information which relates to broadcast programs, a broadcast program information storing device for storing the broadcast program information received by the receiving device, a broadcast program specifying device for specifying the broadcast program whose label is to be created, from among the broadcast programs that correspond to the broadcast program information stored in the broadcast program information storing device, a broadcast program information acquiring device for acquiring the broadcast program information about the broadcast program specified by the broadcast program specifying device from the broadcast program information storing device, a label set specifying device for specifying a plurality of the labels as one suite of label sets, and a label creating device for allocating the broadcast program information pieces acquired by the broadcast program information acquiring device to the labels of the label set specified by the label set specifying device and arranging these information pieces into a print region of these labels to thereby create the labels.

A second aspect of the invention provides a controller comprising a receiving device for receiving broadcast program information which relates to broadcast programs, a broadcast program information storing device for storing the broadcast program information received by the receiving device, and a controller for specifying the broadcast program whose label is to be created, from among the broadcast programs that correspond to the broadcast program information stored in the broadcast program information storing device, acquiring the broadcast program information about this specified broadcast program from the broadcast program information recording device, specifying a plurality of the labels as one suite of label sets, and allocating the acquired broadcast program information pieces to the labels of the specified label set, and arranging these information pieces into a print region of these labels to thereby create the labels.

A third aspect of the invention provides a label creating program comprising a receiving step of receiving broadcast program information which relates to broadcast programs, a broadcast program information storing step of storing the broadcast program information received by the receiving step, a broadcast program specifying step of specifying the broadcast program whose label is to be created, from among the broadcast programs that correspond to the broadcast program information stored in the broadcast program information storing step, a broadcast program information acquiring step of acquiring the broadcast program information about the broadcast program specified by the broadcast program specifying step, a label set specifying step of specifying a plurality of the labels as one suite of label sets, and a label creating step of allocating the broadcast program information pieces acquired by the broadcast program information acquiring step to the labels of the label set specified by the label set specifying step and arranging these information pieces into a print region of these labels to thereby create the labels.

BRIEF DESCRIPTION OF THE DRAWINGS

Exemplary embodiments of the invention will be described in detail with reference to the accompanying drawings in which:

FIG. 13 is a diagram of a further image of the completed label after the arranging processing.

DESCRIPTION OF THE PREFERRED EMBODIMENTS

The following will describe embodiments of the invention with reference to drawings. In the following, a personal computer connected to a printer is exemplified as a label creating apparatus related to the invention. In this personal computer, a "label creating program" related to the invention is installed. First, the label creating apparatus 1 is described with reference to FIG. 1.

Figure 1:
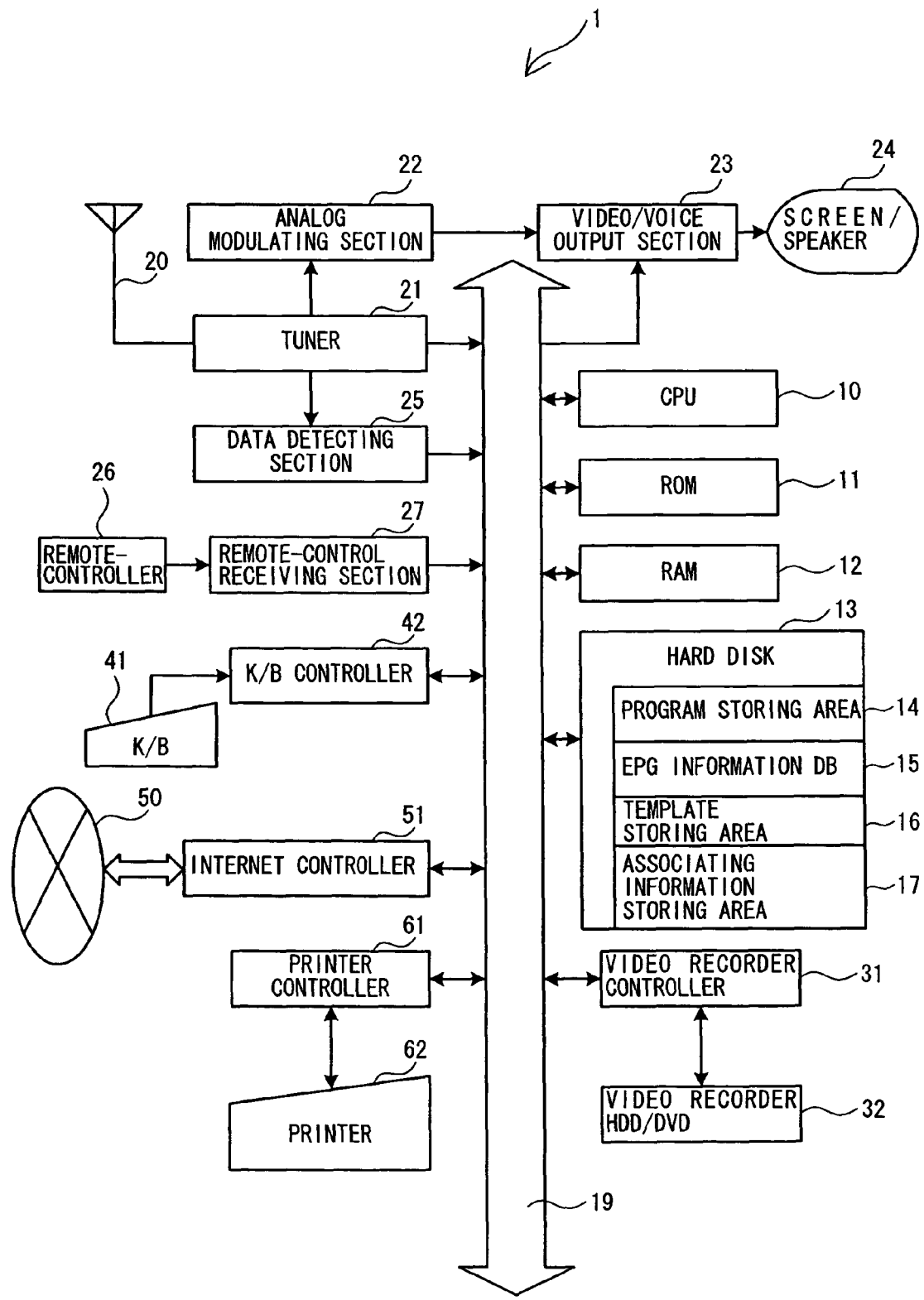
FIG. 1 is a block diagram of an electrical configuration of a label creating apparatus 1.

As shown in FIG. 1, the label creating apparatus 1 has such a configuration that input/output peripheral devices are connected to a personal computer equipped with a TV broadcast receiving tuner, which is a so-called TV-personal computer. The label creating apparatus 1 is provided with a CPU 10 for providing control over the personal computer. To this CPU 10, a ROM 11, a RAM 12, and a hard disk 13 are connected via a bus 19. In the ROM 11, programs such as a BIOS to be executed by the CPU 10 are stored. The RAM 12 stores data temporarily. The hard disk 13 is a device to store data.

The hard disk 13 includes a program storing area 14, an EPG information database (DB) 15, a template storing area 16, an information storing area 17, etc. The program storing area 14 stores a variety of programs to be executed in the label creating apparatus 1 including the label creating program. The EPG information database (DB) 15 accumulates broadcast program information. The template storing area 16 is a collection of templates (which are detailed later) that store beforehand information as a print model such as sizes, fonts, layouts, etc. of individual print-subject information pieces in a print region. The associating information storing area 17 stores associations between data of video-recorded broadcast programs and broadcast program information in the EPG information DB 15.

To the CPU 10, a tuner 21 for receiving TV programs via an antenna 20 is further connected via the bus 19. Broadcast data received by this tuner 21 passes through an analog modulating section 22 and a video/voice output section 23, to be output as a video and a voice to a monitor (screen)/speaker 24. In such a manner, video data and voice data received by the tuner 21 can be video-recorded to a hard disk (HDD) or a DVD by a video-recorder 32 connected via a video-recorder controller 31. The label creating apparatus 1 is configured so that it can be remote-controlled by a remote-controller 26; a remote-control receiving section 27 for receiving a signal from this remote controller 16 is also connected to the CPU 10 via the bus 19. Further, to the tuner 21, a data detecting section 25 for detecting received data and outputting it to the CPU 10 is connected.

To the CPU 10, a keyboard (K/B) controller 42, an Internet controller 51, and a printer controller 61 are further connected via the bus 19. To the keyboard (K/B) controller 42, a keyboard (K/B) 41 on which a user performs input operations is connected to control the operations. The Internet controller 51 is provided to connect to the Internet 50. To the printer controller 61, a printer 62 for printing a created label is connected to control printing.

In the present embodiment, as the printer 62, a tape printer for printing information on an elongated tape is used. The printer 62 is equipped with a printing mechanism which, when mounted in it with a tape cassette detachably, prints information on a tape by driving this tape through between a thermal head having a plurality of heater elements and a platen roller abutted against this thermal head. The tape of the mounted tape cassette has information printed thereon by the printing mechanism and cut off by a tape cutter of the printing mechanism, to be discharge from a discharge outlet. To print information in the printer 62, the user mounts in it a tape cassette that corresponds to specified type and tape width. A tape cassette housing section of the printer 62 is equipped with a detecting section comprised of sensors for detecting a type and a tape width of a mounted tape cassette. Further, at a position on each of the tape cassettes that faces the detecting section, an identification aperture, which can be detected by the detecting section, is formed for showing the type and the tape width of a tape built in.

In the present embodiment, EPG data that provides titles, broadcast times, channels, performers, etc. of broadcast programs is acquired from the Internet 50, manipulated, and accumulated in the EPG information DB 15 in the hard disk 13. The EPG data may not only be acquired from the Internet 50 but also received by the tuner 21 and taken out together with broadcast data.

Next, processing which is performed in the label creating apparatus 1 having the above configuration is described with reference to FIGS. 2-7.

Figure 2:
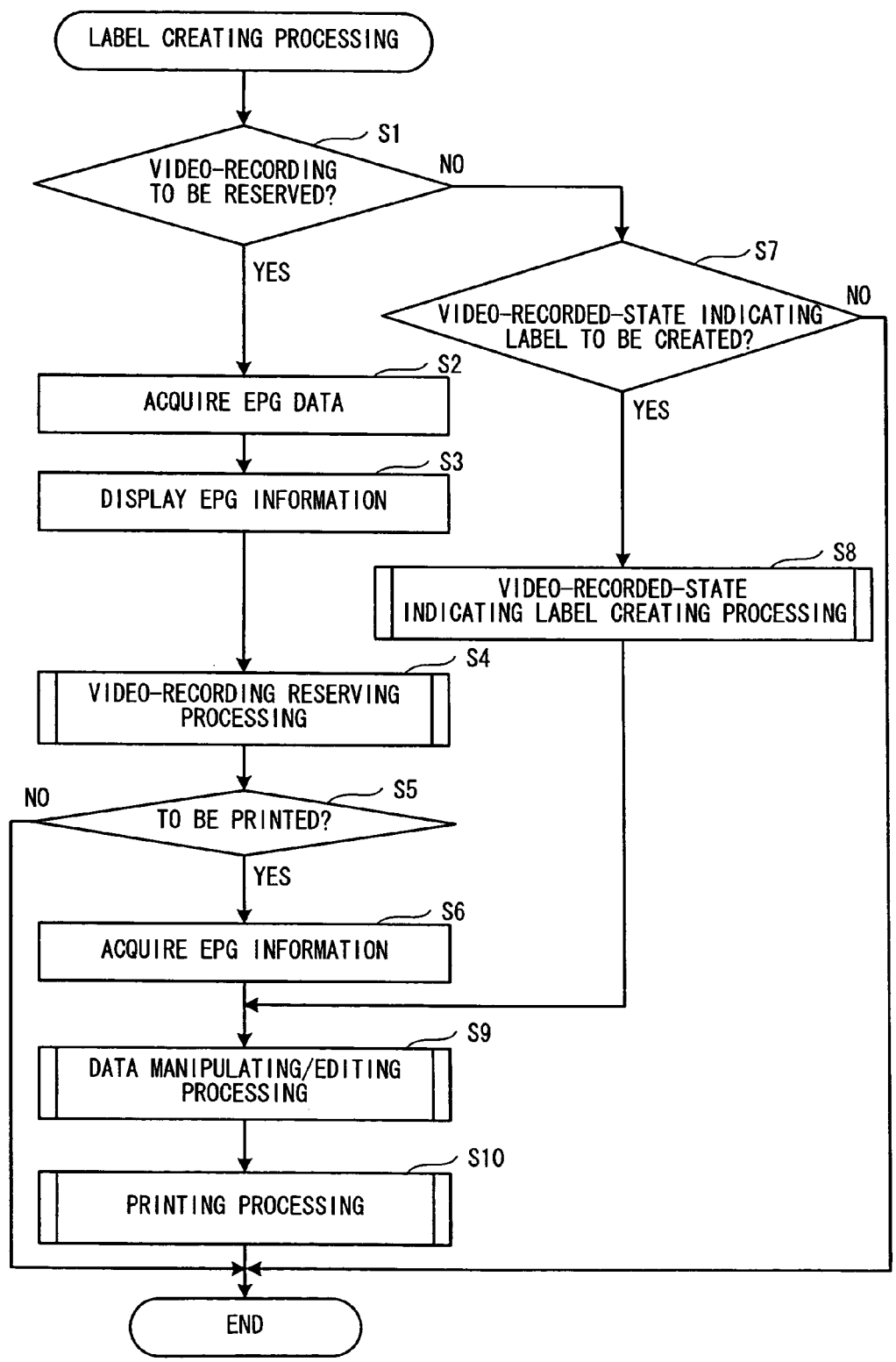
FIG. 2 is a flowchart of an overall flowchart of label creating processing.

As shown in FIG. 2, when label creating processing starts, first the process decides whether video-recording is to be reserved (S1). If video-recording is to be reserved (YES at S1), first the process acquires EPG data (so-called iEPG data) from the Internet 50 (S2). The acquired EPG data is displayed on the screen (S3). When the EPG data is displayed, the process performs video-recording reserving processing for accumulating EPG data of a broadcast program whose video-recording reservation is accepted and which is reserved in the EPG information DB 15 (S4). The video-recording reserving processing is detailed later with reference to FIG. 3.

When the video-recording reserving processing is finished, the process decides whether a label for the reserved broadcast program is to be immediately created and printed (S5). If the label is not to be immediately created (NO at S5), the process ends the label creating processing. If the label is to be immediately created and printed (YES at S5), the process acquires the EPG information of the reserved broadcast program stored by the video-recording reserving processing in the EPG information DB 15 (S6) and goes to S9.

If video-recording is not to be reserved (NO at S1) the process decides whether a label is to be created for already video-recorded data (S7). If a label is not to be created for already video-recorded data (NO at S7), the process ends the label creating processing. If a label is to be created for video-recorded data (YES at S7), the process performs video-recorded-state indicating label creating processing by using the EPG information stored and accumulated in the EPG information DB 15 when video-recording was reserved (S8). The video-recorded-state indicating label creating processing is detailed later with reference to FIG. 5.

If a label for a video-recording-reserved broadcast program is to be created immediately (YES at S5), the process acquires EPG information of that reserved broadcast program (S6) or takes out EPG information to be used in a video-recorded-state indicating label (S8) and then performs manipulating/edition processing on data for which the label is to be created so that the data may be arranged in the print region (S9), performs printing processing to perform printing based on that print data by using the printer, and ends the processing (S10). The data manipulation/edition processing and the printing processing are detailed later with reference to FIGS. 6 and 7 respectively.

Figure 3:
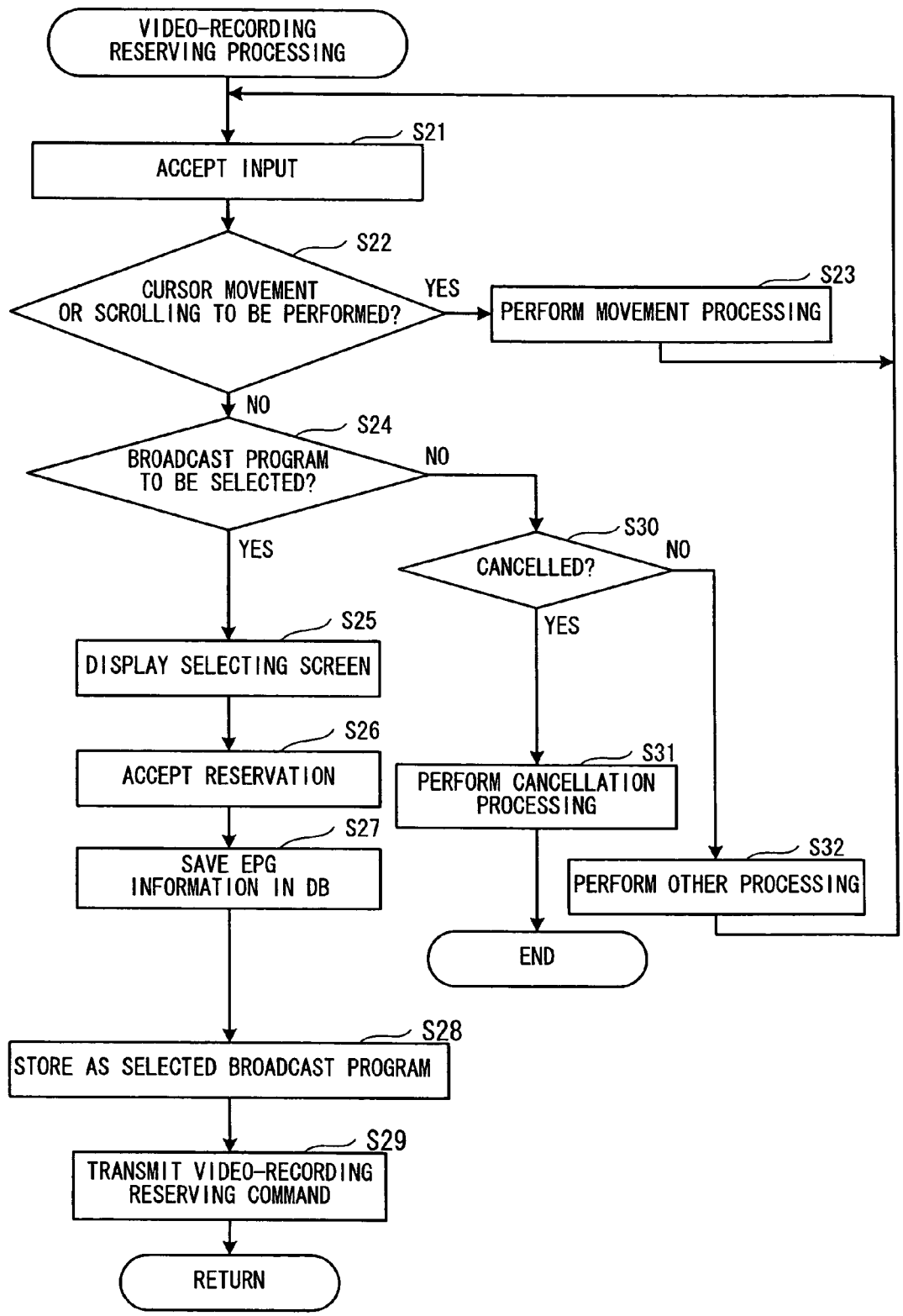
FIG. 3 is a flowchart of video-recording reserving processing which is performed in the label creating processing.

Next, the video-recording reserving processing is described with reference to FIG. 3. First, the process accepts an input through the keyboard 41 or a mouse (not shown) by the user when he has seen the displayed broadcast program information (S21). Then, the process decides whether the input contents command cursor movement or scrolling (S22). If the input contents command cursor movement or scrolling (YES at S22), the process performs the corresponding moving processing (S23) and returns to the input accepting step (S21).

If the input contents do not command cursor movement or scrolling (NO at S22), the process decides whether a command is input to select a broadcast program to be reserved (S24). If the input contents command to select the broadcast program (YES at S24), the process displays a screen for selection (S25), to accept video-recording reservation (S26). Then, the process additionally saves EPG information of the reserved broadcast program in the EPG information DB 15 (S27). In this case, it is also possible to immediately create a label for the video-recording-reserved broadcast program, so that in case for this, the reserved broadcast program is temporarily stored in the RAM 12 as a broadcast program for which a label is to be created (S28). Then, the process transmits a video-recording command to the video-recorder 32 (S29) and returns to the label creating processing of FIG. 2.

If the input contents do not command to select the broadcast program (NO at S24), the process decides whether it is a cancellation command (S30). If the input contents command cancellation (YES at S30), the process performs canceling processing (S31), to end the overall label creating processing. If the input contents do not command cancellation (NO at S30), the process performs other processing concerning video-recording reservation (S32) and returns to S21 of input acceptance.

Figure 4:
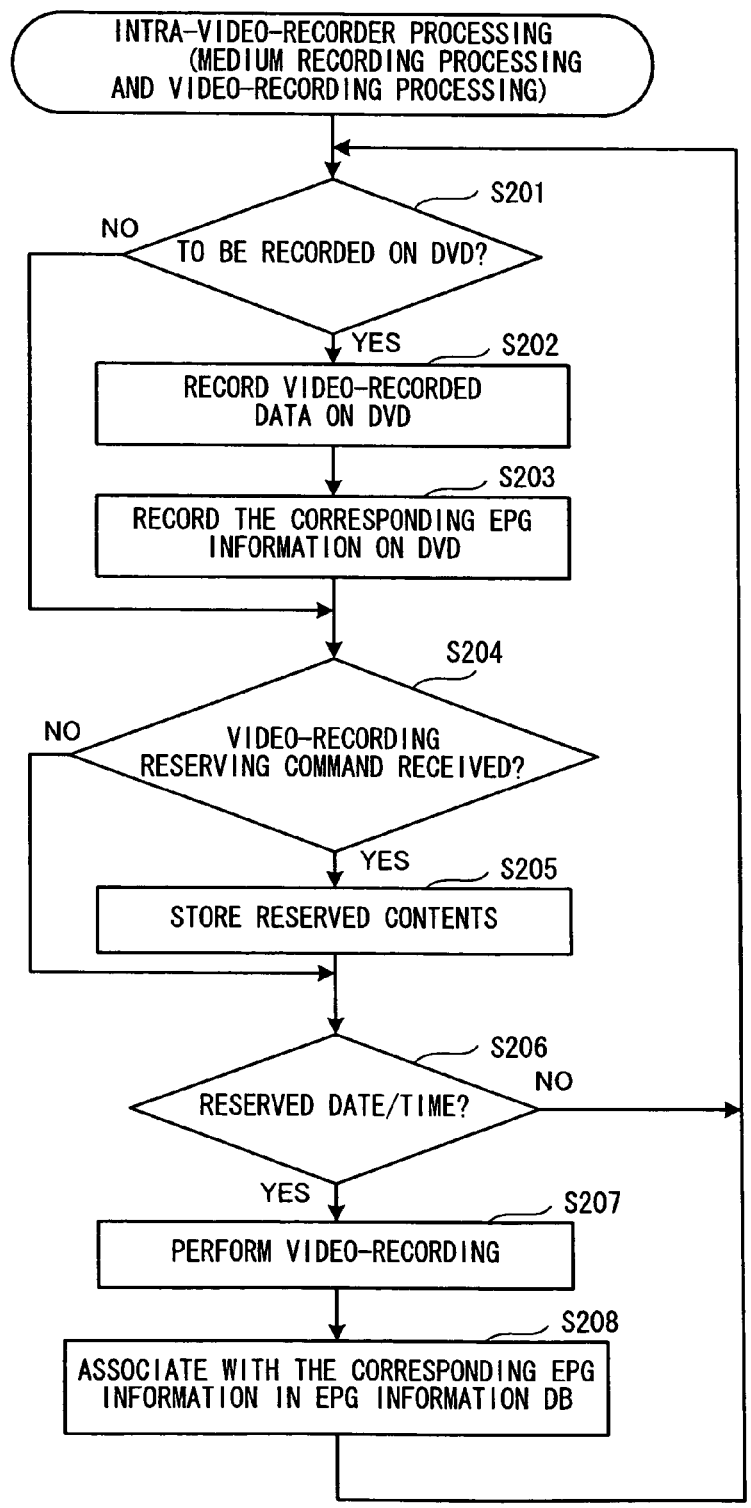
FIG. 4 is a flowchart of medium recording processing and video-recording processing.

The following will describe video-recording processing which is performed by the video-recorder 32 based on a video-recording reserving command and medium recording processing for recording video-recorded data recorded on a hard disk to a DVD with a command input by the user, with reference to FIG. 4. First, the process decides whether a command is input to record video-recorded data to a DVD (S201). If the input does not command recording to the DVD (NO at S201), the process directly goes to S204. If the input commands recording to the DVD (YES at S201), video-recorded data selected is recorded to the attached DVD (S202). Then, EPG information associated with that video-recorded data is read from the EPG information DB 15 and recorded on the DVD (S203). By thus recording the EPG information on the DVD, when a label is to be created for a video-recorded broadcast program on the DVD, the corresponding information can be acquired quickly.

Next, the process decides whether a video-recording reserving command is received (S204). If no new video-recording reserving command is received (NO at S204) the process directly goes to S206.

If a video-recording reserving command is reserved (YES at S204), the process stores reserved contents (S205). Then, the process decides whether a date/time specified by the stored reserving command has come (S206). If the specified date/time has not come yet (NO at S206), the process returns to S201. If the specified date/time has come (YES at S206), the process performs video-recording in accordance with this video-recording reserving command (S207). Then, the process associates video-recorded data and the corresponding EPG information in the EPG information DB 15 (S208) and returns to S201 to repeat the above processing. In this case, the video-recorded data and the EPG information are associated with each other by storing a table that correlates them with each other in the associating information storing area 17. It is to be noted that the video-recorded data and the EPG information only need to be correlated with each other, so that such a configuration may be employed that a flag indicative of the video-recorded data may be directly stored in the EPG information DB 15.

Figure 5:
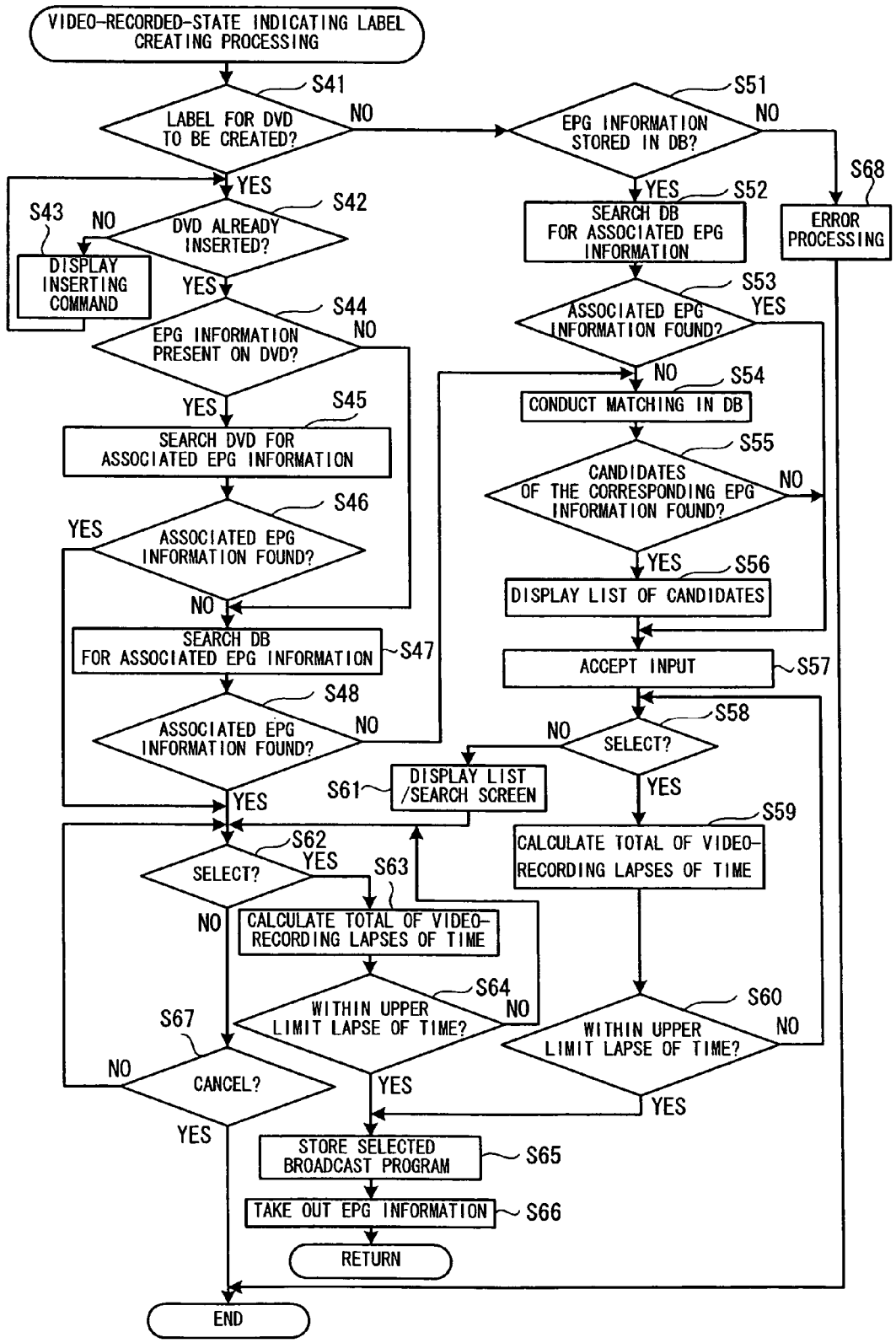
FIG. 5 is a flowchart of video-recorded-state indicating label creating processing which is performed in the label creating processing.
Figure 6:
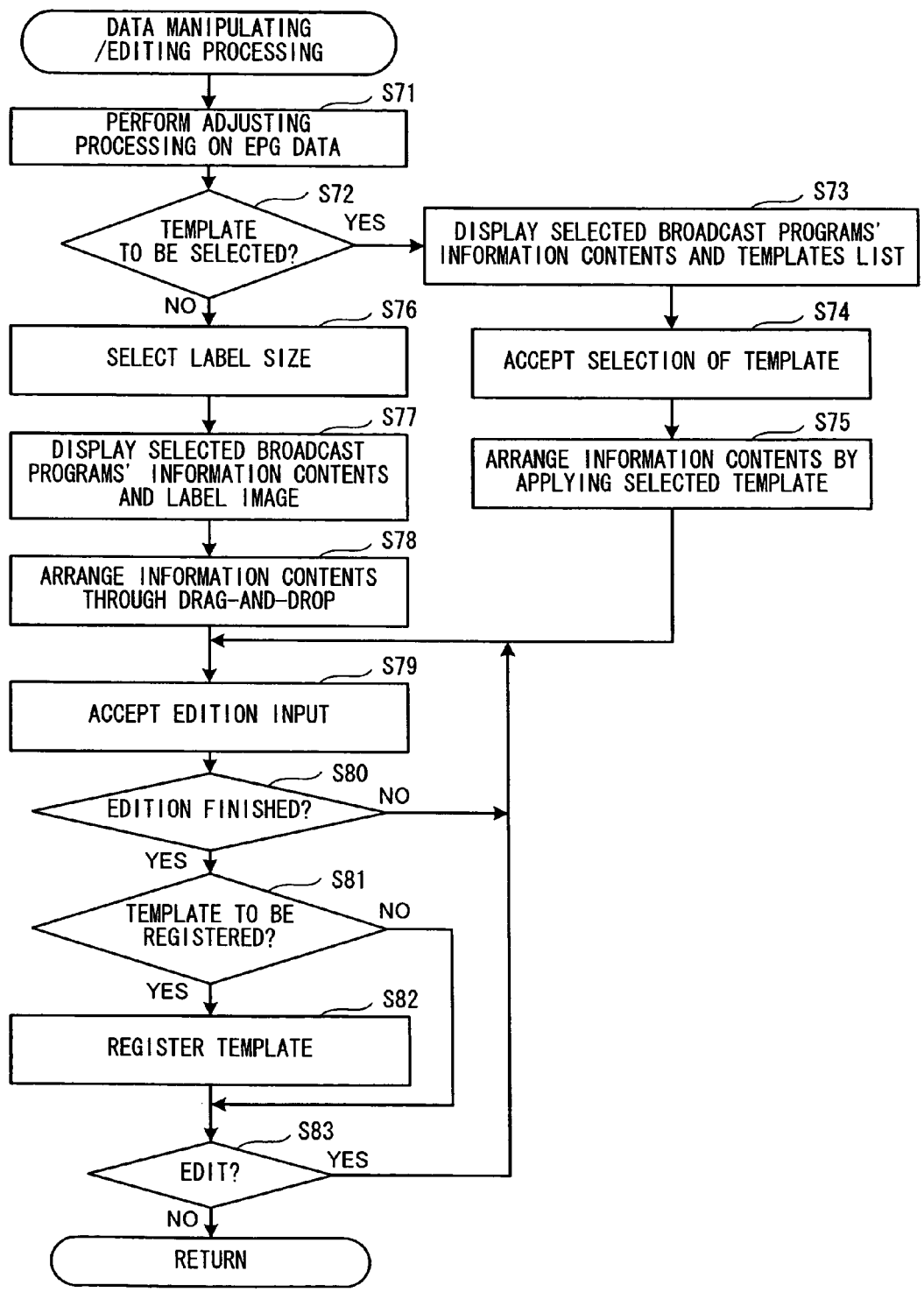
FIG. 6 is a flowchart of data manipulating/editing processing which is performed in the label creating processing.

Next, the video-recorded-state indicating label creating processing is described with reference to FIG. 5. First, the process decides whether it is commanded to create a label to be attached to the DVD (S41). If it is decided to create a label for the DVD (YES at S41), the process decides whether the DVD is inserted in a DVD drive (S42). If the DVD is yet to be inserted (NO at S42), the process displays a DVD inserting command on the screen (S43) and returns to S42 to detect insertion of the DVD again.

If insertion of the DVD is detected (YES at S42), the process decides whether the EPG information is stored on that DVD (S44). If the EPG information is stored on the DVD (YES at S44), the process searches the DVD for the EPG information associated with the video-recorded information (S45). Then, the process decides whether the associated EPG information is found as a result of the search (S46). If the associated EPG information is found (YES at S46), the process goes to S62 to decides whether that EPG information is to be selected as a broadcast program whose label is to be created.

If the associated EPG information is not found on the DVD (NO at S46) or no EPG information is stored on the DVD (NO at S44), the process searches the EPG information DB 15 for EPG information associated with the video-recorded information (S47). Then, the process decides whether the associated EPG information is found as a result of search of the EPG information DB 15 (S48). If the associated EPG information is found (YES at S48), the process decides whether that EPG information is to be selected as a broadcast program whose label is to be created (S62). In this case, a plurality of broadcast programs can be selected and input as those whose label is to be created.

Next, if the broadcast programs whose labels are to be created are selected (YES at S62), the process adds up video-recording lapses of time included in the EPG information of the selected broadcast programs (S63). Then, the process decides whether a calculated total video-recording lapse of time is within a preset upper limit lapse of time (S64). Since a video-recording medium such as a DVD has an upper limit lapse of time during which information can be video-recorded, this decision is made to select broadcast programs that may not overflow that upper limit lapse of time when creating labels. It is thus possible to avoid creating, in one suite of label set, the labels of so many broadcast programs as not to be recorded completely on one DVD.

If the total video-recording lapse of time is within the upper limit lapse of time (YES at S64), the process stores the broadcast programs in the RAM 12 as selected broadcast programs (S65) and takes out their EPG information from the EPG information DB 15 (S66). Then, the process returns to the label creating processing of FIG. 2. If the total video-recording lapse of time is in excess of the upper limit lapse of time (NO at S64), the process returns to S62 to select broadcast programs over again.

Further, if no EPG information associated with the video-recorded information on the DVD is found in the EPG information DB 15 (NO at S48), the process searches the EPG information DB 15 for EPG information that is considered to correspond to the video-recorded information (S54). For example, by conducting matching by using item information such as titles, broadcast times, and channels, the corresponding EPG information may be found highly likely. The process decides whether candidates of the corresponding EPG information are found as a result of the matching (S55) and, if they are not found (NO at S55), directly goes to S57, where the user inputs the EPG information manually. If candidates of the corresponding EPG information are found (YES at S55), the process displays a list of the candidates (S56), over which the user inputs his decision on whether they correspond to the video-recorded information (S57). In this case, a plurality of broadcast programs whose labels are to be created can be input. Then, the process decides whether that EPG information is to be selected as a broadcast program whose label is to be created (S58). If any EPG information piece is selected from among the candidates based on the accepted input (YES at S58), the process adds up video-recording lapses of time included in the EPG information of the selected broadcast programs (S59). Then, the process decides whether a calculated total video-recording lapse of time is within a preset upper limit lapse of time (S60). If the calculated total video-recording lapse of time is within the preset upper limit lapse of time (YES at S60), the process stores these broadcast programs in the RAM 12 as selected broadcast programs (S65) and takes out EPG information of these broadcast programs from the EPG information DB 15 (S66). Then, the process returns to the label creating processing of FIG. 2. If the calculated total video-recording lapse of time is in excess of the upper limit lapse of time (NO at S60), the process returns to S58 to select broadcast programs over again.

On the other hand, if no EPG information is selected from the candidates (NO at S58), it means that there is no corresponding EPG information among the candidates. Therefore, a list display/research screen is displayed to enable the user to arbitrarily search the DB for the corresponding EPG information and select it (S61). The process waits for the user selecting any EPG information and, if EPG information is selected (YES at S62), adds up video-recording lapses of time included in the EPG information of the selected broadcast programs (S63). Then, the process decides whether a calculated total video-recording lapse of time is within the preset upper limit lapse of time (S64). If the calculated total video-recording lapse of time is within the preset upper limit lapse of time (YES at S64), the process stores these broadcast programs in the RAM 12 as selected broadcast programs (S65) and takes out EPG information of these broadcast programs from the EPG information DB 15 (S66). Then, the process returns to the label creating processing of FIG. 2. If the calculated total video-recording lapse of time is in excess of the upper limit lapse of time (NO at S64), the process returns to S62 to select broadcast programs over again.

If no EPG information is selected by the user (NO at S62), the process decides whether a cancellation command is issued (S67). If the cancellation command is issued (YES at S67), the process ends the label creating processing as a whole and, if the cancellation command is not issued (NO at S67), returns to S62 to wait for selection.

On the other hand, if it is not commanded to create a label for a DVD (NO at S41), the process decides whether EPG information is stored in the EPG information DB 15 (S51). If no EPG information is stored in the EPG information DB 15 (NO at S51), no label can be created, so that the process performs error processing (S68) and ends the processing as a whole.

If EPG information is stored in the EPG information DB 15 (YES at S51), the process searches the EPG information DB 15 for EPG information associated with the video-recorded information (S52). Then, the process decides whether the associated EPG information is found as a result of the search (S53). If the associated EPG information is found (YES at S53), the process goes to S57 to accept an input by the user and decides whether, as a result, that EPG information is selected as a broadcast program whose label is to be created (S58). In this case, a plurality of broadcast programs can be selected and input. If any EPG information piece is selected from among the candidates based on the accepted input (YES at S58), the process adds up video-recording lapses of time included in the EPG information of the selected broadcast programs (S59). Then, the process decides whether a calculated total video-recording lapse of time is within the preset upper limit lapse of time (S60). If the calculated total video-recording lapse of time is within the preset upper limit lapse of time (YES at S60), the process stores these broadcast programs in the RAM 12 as selected broadcast programs (S65) and takes out EPG information of these broadcast programs from the EPG information DB 15 (S66). Then, the process returns to the label creating processing of FIG. 2. If the calculated total video-recording lapse of time is in excess of the upper limit lapse of time (NO at S60), the process returns to S58 to select broadcast programs over again.

By thus selecting broadcast programs in such a manner as not to exceed the upper lapse of time and creating the corresponding labels, it is possible to correspondingly perform a series of jobs of video-recording the information from the hard disk to a DVD and attaching a label to the DVD efficiently.

If no EPG information associated with the video-recorded information on the DVD is found in the EPG information DB 15 (NO at S53), the process searches the EPG information DB 15 for EPG information that is considered to correspond to the video-recorded information (S54). For example, by conducting matching by using item information such as titles, broadcast times, and channels, the corresponding EPG information may be found highly likely. The process decides whether candidates of the corresponding EPG information are found as a result of the matching (S55) and, if they are not found (NO at S55), directly goes to S57, where the user inputs the EPG information manually. If candidates of the corresponding EPG information are found (YES at S55), the process displays a list of the candidates (S56), to cause the user to input his decision on whether they correspond to the video-recorded information (S57). If any EPG information piece is selected from among the candidates based on the accepted input (YES at S58), the process adds up video-recording lapses of time included in the EPG information of the selected broadcast programs (S59). Then, the process decides whether a calculated total video-recording lapse of time is within the preset upper limit lapse of time (S60). If the calculated total video-recording lapse of time is within the preset upper limit lapse of time (YES at S60), the process stores these broadcast programs in the RAM 12 as selected broadcast programs (S65) and takes out EPG information of these broadcast programs from the EPG information DB 15 (S66). Then, the process returns to the label creating processing of FIG. 2. If the calculated total video-recording lapse of time is in excess of the upper limit lapse of time (NO at S60), the process returns to S58 to select broadcast programs over again.

If no broadcast program is selected (NO at S58), it means that there is no corresponding EPG information among the candidates. Therefore, a list display/research screen is displayed to enable the user to arbitrarily search the DB for the corresponding EPG information and select it (S61). The process waits for the user selecting any EPG information and, if EPG information is selected (YES at S62), adds up video-recording lapses of time included in the EPG information of the selected broadcast programs (S63). Then, the process decides whether a calculated total video-recording lapse of time is within the preset upper limit lapse of time (S64). If the calculated total video-recording lapse of time is within the preset upper limit lapse of time (YES at S64), the process stores these broadcast programs in the RAM 12 as selected broadcast programs (S65) and takes out EPG information of these broadcast programs from the EPG information DB 15 (S66). Then, the process returns to the label creating processing of FIG. 2. If the calculated total video-recording lapse of time is in excess of the upper limit lapse of time (NO at S64), the process returns to S62 to select broadcast programs over again.

If no EPG information is selected (NO at S62), the process decides whether a cancellation command is issued (S67). If the cancellation command is issued (YES at S67), the process ends the label creating processing as a whole and, if the cancellation command is not issued (NO at S67), returns to S62 to wait for EPG information to be selected.

Although the above processing has been configured that if it is decided at S60 or S64 that a calculated total video-recording lapse of time exceeds a preset upper limit lapse of time, broadcast programs are selected over again until the calculated total value may not exceed the preset value, instead of selecting them over again, the number of DVDs, that is, the number of suites of label sets that are required to video-record all of selected broadcast programs may be calculated beforehand to increase the number of label sets as required during data manipulating/editing processing.

Next, the data manipulating/editing processing which is performed in the label creating processing is described with reference to FIGS. 6 and 8-13.

In the data manipulating/editing processing, first the process converts EPG information acquired from the EPG information DB 15 for a broadcast program selected whose label is to be created into a format easy to perform internal processing (S71). For example, if EPG information is received in text data, the data is adjusted so as to convert the EPG information into a tabular form. Next, the process decides whether a label is to be created using a template (S72). This decision can be made on the basis of whether the user has input a template selecting command or the like.

If labels are to be created without using a template (NO at S72), the process prompts the user to select a size of a label to be created and accepts his input (S76). In this case, a plurality of labels can be specified in a label set, so that their sizes are each specified. For example, one label has a size of 3.5 mm×120 mm and one suite of three labels have a size of 36 mm×110 mm.

Figure 8:
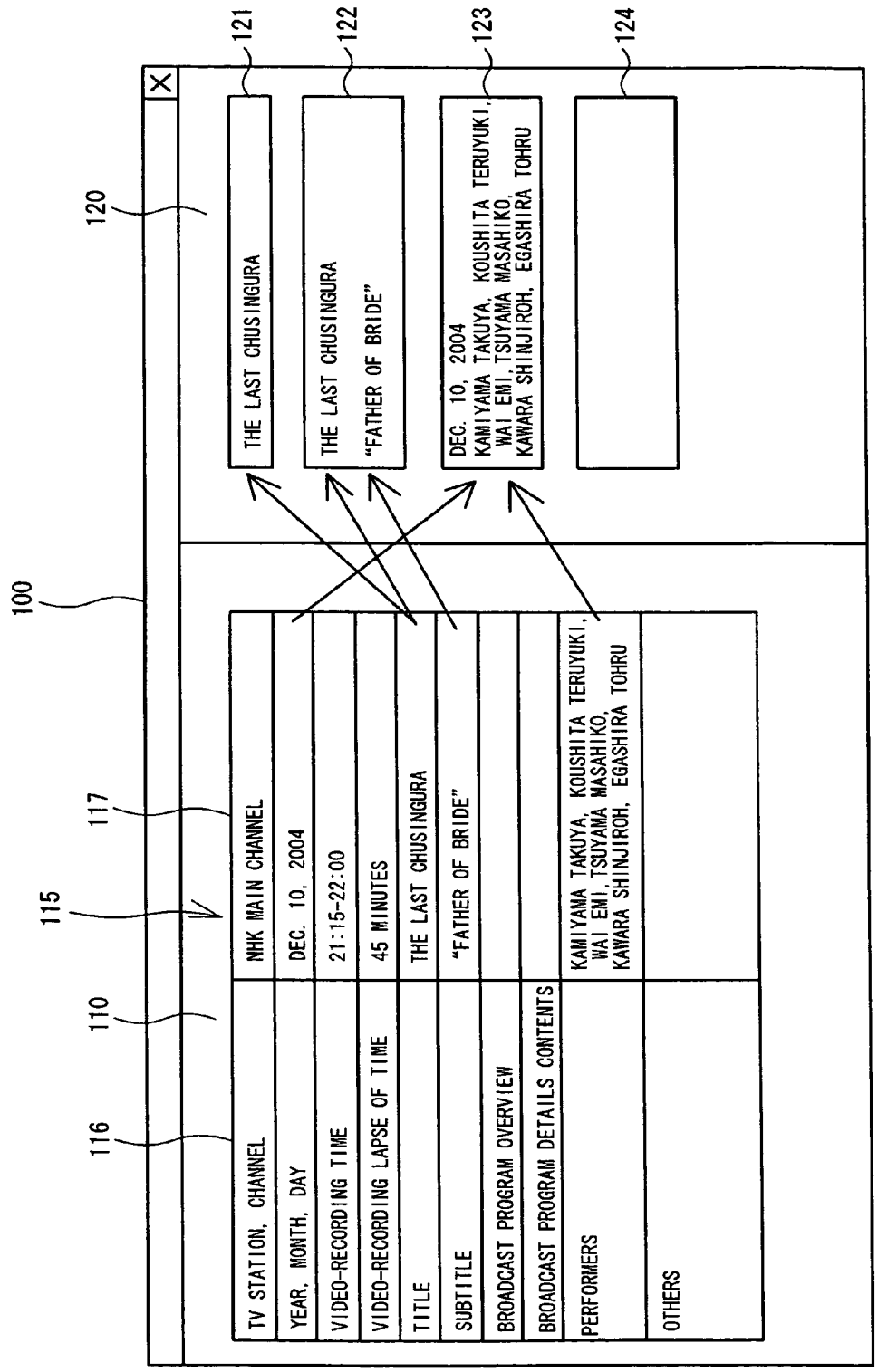
FIG. 8 is an illustration of an image of an arranging processing screen in a case where no template is used.

Next, the process displays contents of the EPG information of the selected broadcast programs and a print image of the label (S77). For example, as shown in FIG. 8, the process displays EPG information 115 comprised of a plurality of items 116 and contents 117 on a left screen 110 and print images of a label 121 with a size of 3.5 mm×120 mm and labels 122, 123, and 124 with a size of 36 mm×110 mm on a right screen on an arrangement screen 100.

Then, the process accepts the user's positioning EPG information of a desired item in the label print region through drag-and-drop operations (S78). In this case, in response to the drag-and-drop operations, contents of a drag departure point are inserted into the labels 121-124 at a drop destination point and displayed. In an example of FIG. 8, title information is dropped and inserted into the labels 121 and 122, subtitle information is dropped and inserted into the label 122, date information is dropped and inserted into the label 123, and performer information is dropped and inserted into the label 123, thereby creating the labels 121-123. Font sizes and modifications can be edited at S79 and the subsequent. Further, labels such as the label 124 may be provided as blank labels first so that information can be input in them arbitrarily later.

Figure 9:
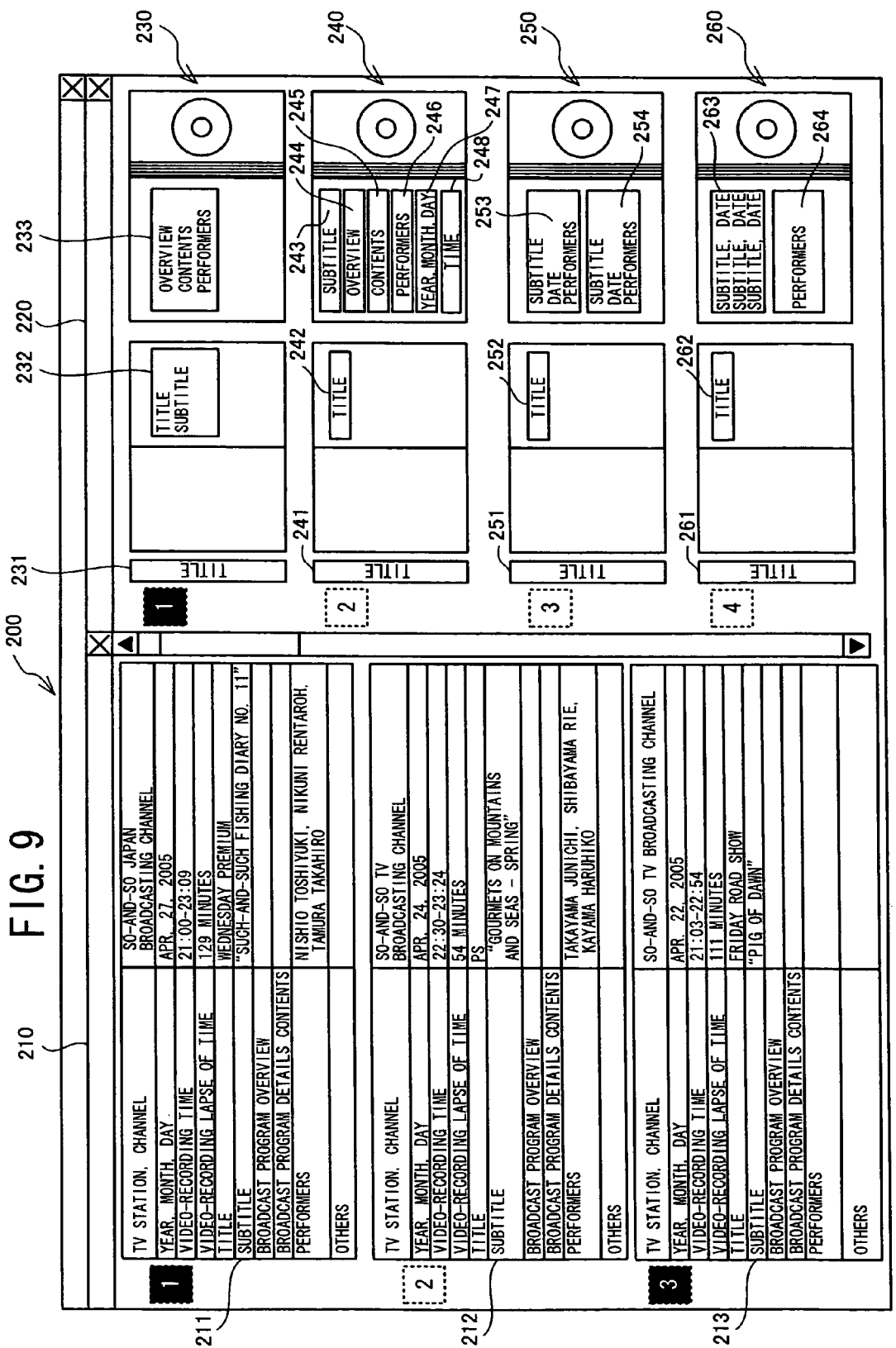
FIG. 9 is an illustration of an image of the processing screen in a case where arranging processing is performed on a plurality of broadcast programs and a plurality of label sets by using a template.
Figure 10:
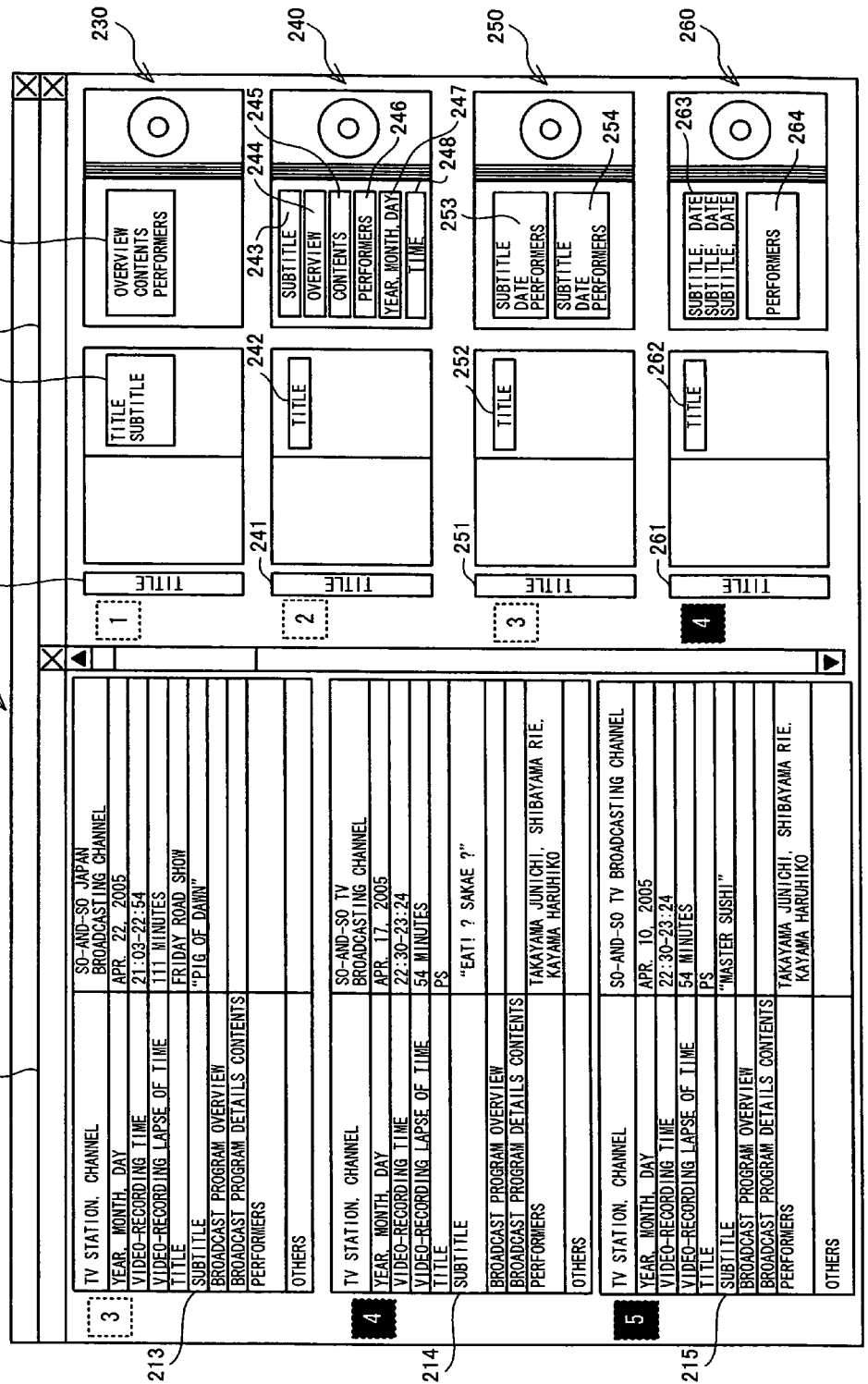
FIG. 10 is an illustration of another image of the processing screen in a case where a plurality of broadcast programs and a plurality of label sets are arranged by using a template.

On the other hand, if a template is to be used (YES at S72), the process displays a list of available templates together with contents of EPG information of the selected broadcast programs (S73). For example, as shown in FIGS. 9 and 10, the process provides side-by-side displays of EPG information pieces 211-215, . . . of a plurality of selected broadcast programs on a left screen 210 on an arrangement screen 200. On a right screen 220, the process provides side-by-side display of templates 230, 240, 250, and 260 of a label set. It is to be noted that since the templates 230, 240, 250, and 260 are a label set to be attached to a DVD case, they are displayed in a condition where the label is attached so that the user can get an image thereof.

The template 230 is a label set comprised of three labels of a 3.5 mm-wide label 231 to be attached to a back of a DVD case, a 36 mm-wide label 232 to be attached to a front face of the DVD case, and a 36 mm-wide label 233 to be attached to a rear face of the DVD case so that the title information may be inserted into the label 231, the title information and the subtitle information may be inserted side by side into the label 232, and broadcast program overview information, broadcast program detailed contents information, and the performer information may be inserted into the label 233 side by side.

The template 240 is a label set comprised of eight labels of a 3.5 mm-wide label 241 to be attached to the back of the DVD case, a 18 mm-wide label 242 to be attached to the front face of the DVD case, 12 mm-wide labels 243 and 244, 18 mm-wide labels 245 and 246, and 9 mm-wide labels 247 and 248 to be attached to the rear face of the DVD case so that the title information may be inserted into the labels 241 and 242, the subtitle information may be inserted into the label 243, the broadcast program overview information may be inserted into the label 244, the broadcast program detailed contents information may be inserted into the label 245, the performer information may be inserted into the label 246, the date information may be inserted into the label 247, and the video-recording time information may be inserted into the label 248.

The templates 250 and 260 are the templates used to collectively arrange a plurality of selected broadcast programs into one suite of label sets. The template 250 is a label set comprised of four labels of a 3.5 mm-wide label 251 to be attached to the back of the DVD case, a 18 mm-wide label 252 to be attached to the front face of the DVD case, and 36 mm-wide labels 253 and 254 to be attached to the rear face of the DVD case. The title information is inserted into the labels 251 and 252 and the subtitle information, the date information, and the performer information of each of the selected broadcast programs are inserted side by side into the labels 253 and 254. The labels 253 and 254 are each prepared as many as the number of the selected broadcast programs, so that if three or more broadcast programs are selected, the labels having the same shapes as the labels 253 and 254 are added.

The template 260 is a label set comprised of four labels of a 3.5 mm-wide label 261 to be attached to the back of the DVD case, a 18 mm-wide label 262 to be attached to the front face of the DVD case, and 36 mm-wide labels 263 and 264 to be attached to the rear face of the DVD case. The title information is inserted into the labels 261 and 262, the subtitle information and the date information of all of the selected broadcast programs are inserted side by side into the label 263, and performers are collectively inserted into the label 264.

Figure 11:
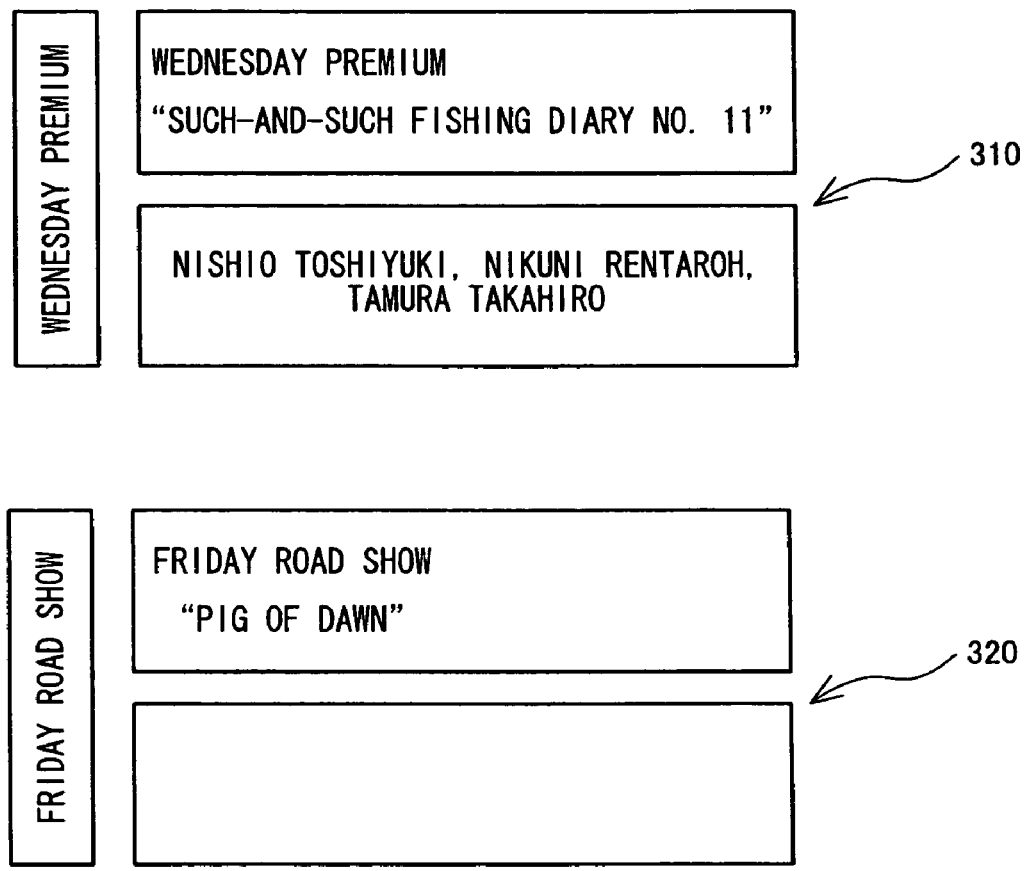
FIG. 11 is a diagram of an image of a completed label after the arranging processing.

Next, the process waits for the user to select and to input a template (S74), to arrange information contents into the label print region by applying the selected template (S75). For example, if the EPG information pieces 211 and 213 in FIG. 9 are selected and the template 230, which is used to create one label set for each of the selected EPG information pieces, is applied, as shown in FIG. 11, a label set 310 corresponding to the EPG information 211 and a label set 320 corresponding to the EPG information 212 are created and displayed. This created label sets undergo printing and after the printing, the label sets can be attached to the two sheets of DVD cases and utilized.

Figure 12:
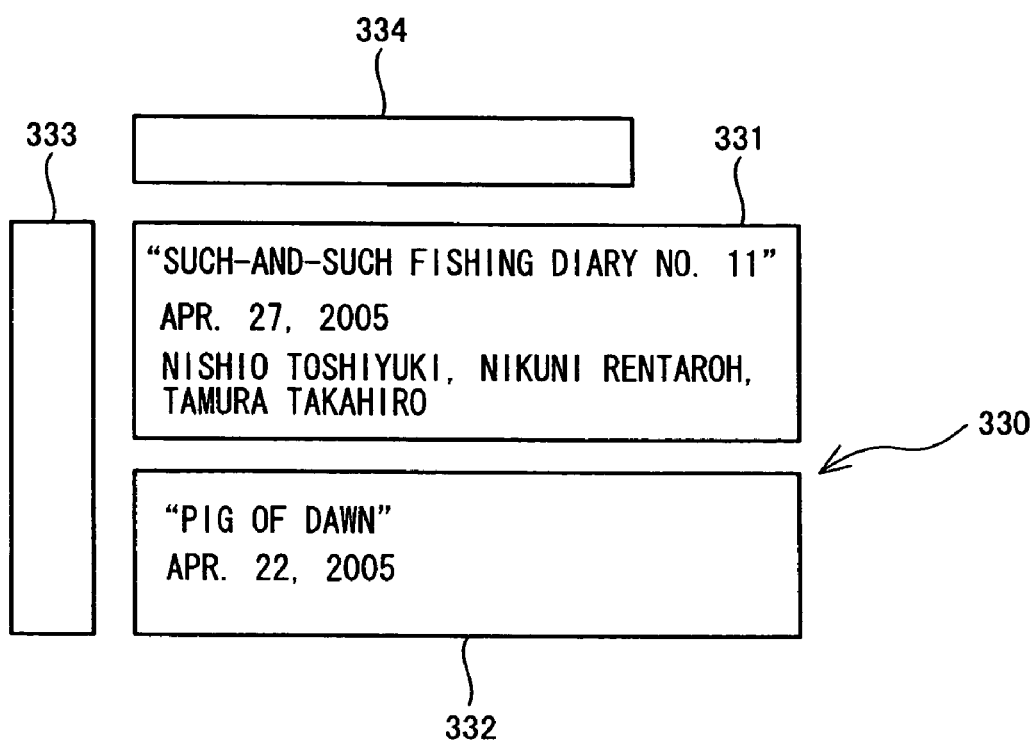
FIG. 12 is a diagram of another image of the completed label after the arranging processing.

Further, if the EPG information pieces 211 and 213 of FIG. 9 are selected and the template 250, which is used to collectively arrange a plurality of selected non-serial broadcast programs into one label set, is applied, as shown in FIG. 12, a label set 330 is created and displayed. In this case, the subtitle information, the date information, and the performer information of the EPG information 211 are inserted into the label 253 in the template 250 to create a label 331, while the subtitle information, the date information, and the performer information of the EPG information 213 are inserted into the label 254 in the template 250 to create a label 332. Further, since there is no title common to the EPG information pieces 211 and 213, the labels 251 and 252 in the template 250 used to insert the title information therein are created as blank labels 333 and 334 respectively. With this, the user might as well input a title such as, for example, "MOVIE" in later-described editing processing of S79.

Further, if a plurality of serial broadcast programs such as the EPG information pieces 212 of FIG. 9 and the EPG information pieces 214, 215, . . . , of FIG. 10 is selected and the template 260, which is used to collectively arrange a plurality of selected serial broadcast programs into one label set, is applied, as shown in FIG. 13, label sets 340 and 350 are created and displayed. In this case, two suites of label sets are created because the seven broadcast programs are selected and two DVDs are required for a total video-recording lapse of time. By thus creating the label sets to then video-record information from the HDD to the DVDs, it is unnecessary to print information on labels many times or video-recording broadcast programs over again, thereby enabling creating favorite video-recording media whose contents can be easily understood quickly and rearranged easily.

In such a manner, in both cases of using a template and using no template, broadcast program information is arranged in a label to display an image of the label on the screen, so that a user's input for edition on the arranged label is accepted (S79). In such a manner, the templates are not fixed but can be arbitrarily edited from a condition where they are applied. The process accepts his input for edition (S79) until the edition is finished (NO at S80) and, if the edition is finished (YES at S80), decides whether the relevant template is to be registered so that modification information, arrangement information, etc. obtained as a result of the edition may be used as a print model from the next time onward (S81). Whether to register templates or not can be queried by such a method as, for example, preparing a dialog box for so that the user can arbitrarily enter his decision in it.

To register a template (YES at S81), the process registers it by storing the current condition in the template storing area 16 as a template (S82). Not to register a template (NO at S81), the process directly goes to S83. Then, the process decides whether to perform edition further, based on an input by the user (S83) and, if edition is to be continued (YES at S83), returns to S79. To end the editing (NO at S83), the process returns to the label creating processing of FIG. 2.

Figure 7:
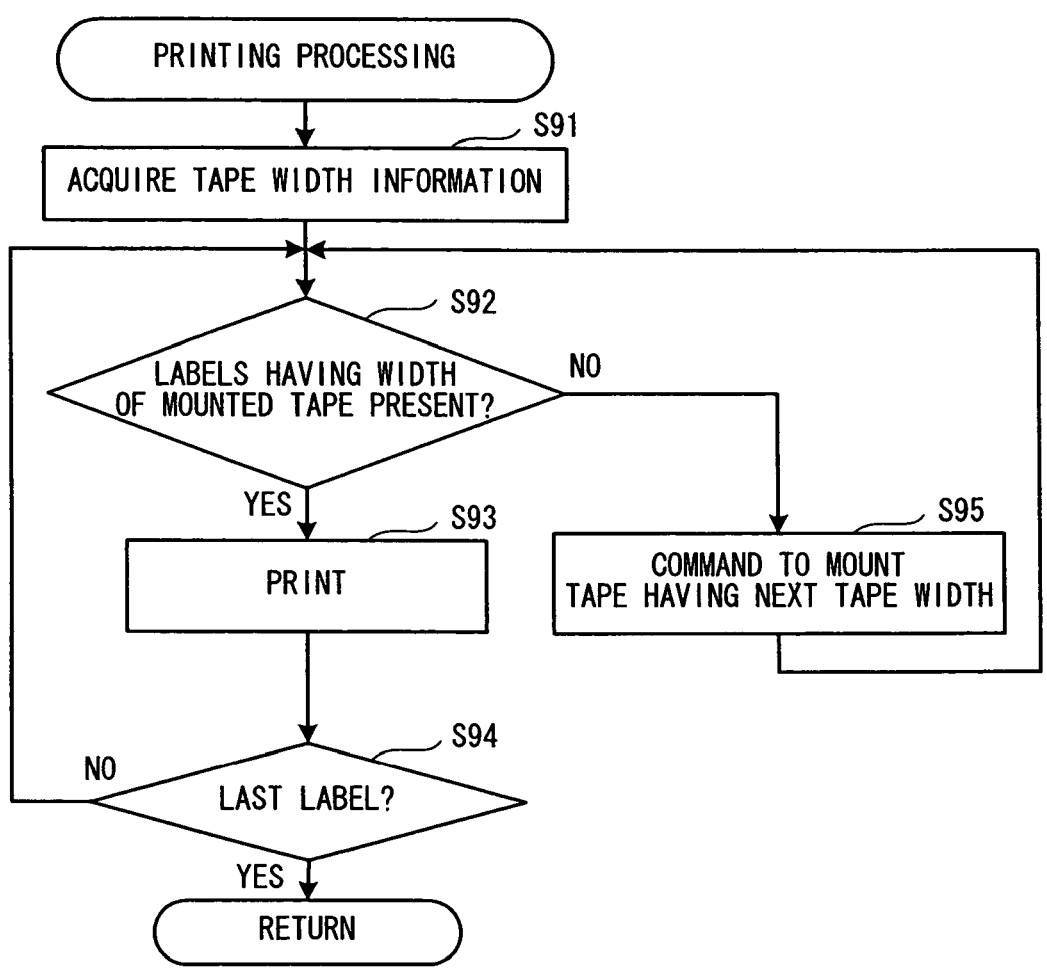
FIG. 7 is a flowchart of printing processing which is performed in the label creating processing.

Next, printing processing which is performed in the label creating processing is described with reference to FIG. 7. First, the process acquires information about a tape width of a created label and a tape width of a tape mounted to the printer 62 (S91).

Next, the process decides whether there is a label having the tape width of the mounted tape among created labels (S92). If there is a label having the tape width of the mounted tape (YES at S92), the process transmits a print image of that label to the printer 62 and commands it to print it (S93). Then, the process decides whether the label commanded for printing is a last one (S94). If the label is not the last one (NO at S94), the process returns to S92.

If there is no label having the tape width of the mounted tape (NO at S92), the process commands mounting a tape having the next tape width (S95). For example, if a 24-mm wide tape is mounted originally and printing of information on a label by use of the 24-mm wide tape is finished, the process commands mounting of, for example, a 36-mm wide tape. Then, the process returns to S92.

In such a manner, although printing can be performed on labels of a plurality of widths the process consecutively performs printing information (S93) on the labels having the tape width of the mounted tape until the last label of that width is encountered (NO at S94). If all printing is finished on the labels corresponding to all of the tape widths (YES at S94), the process returns to the label creating processing of FIG. 2.

As described above, according to the label creating apparatus 1 of the present embodiment, EPG data is received and stored on the EPG information DB 15 at the time of video-recording reservation, so that when data is actually video-recorded, this video-recorded data is associated with the EPG information in the EPG information DB 15. A label for desired video-recorded broadcast programs can be created on the basis of acquired data of EPG information associated with the video-recorded broadcast programs that has been retrieved from the EPG information DB 15. Further, since a plurality of labels can be specified as one suite of label set, labels can be arranged to the overall label sets at a time without individually specifying information about arrangement of each of the labels. The labels can thus be arranged by the user arbitrarily or by using a prepared template.

Figure 14:
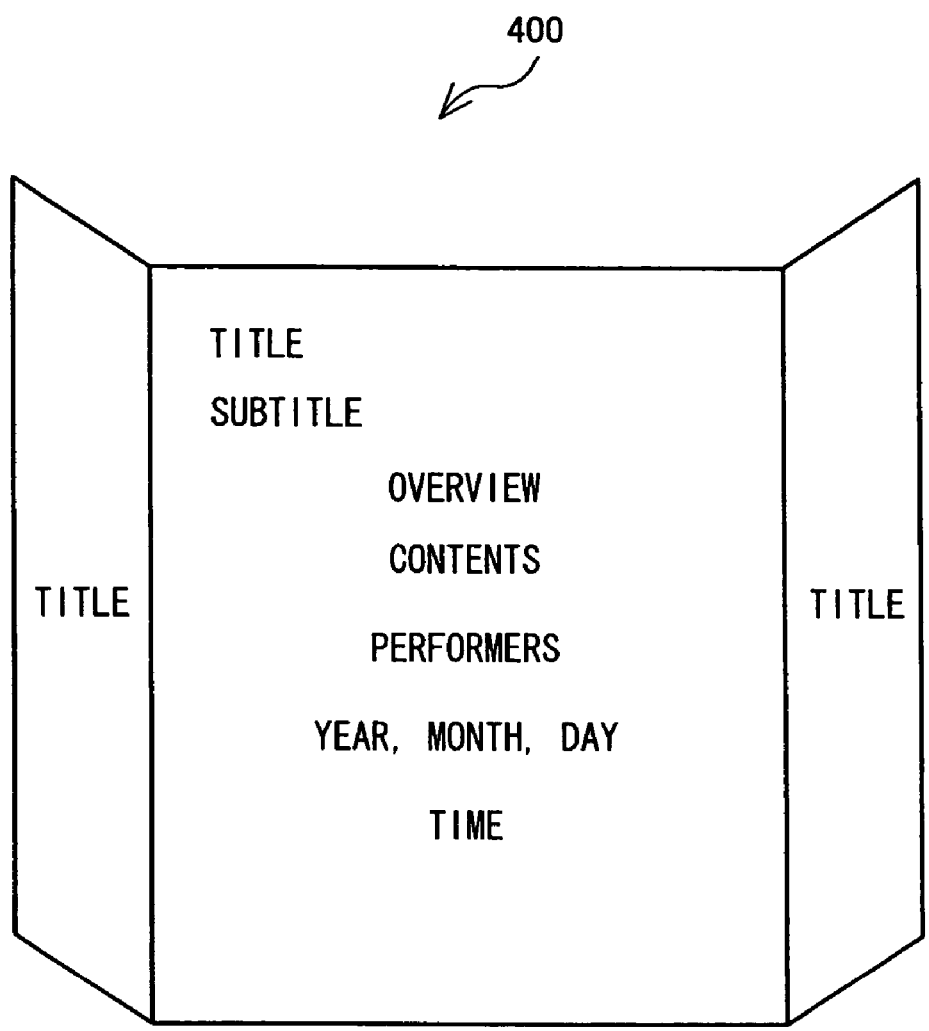
FIG. 14 is a diagram of an image of a template according to a variant.

In the above embodiment, the printer 62 is constituted of a tape printer and each label is created by using a tape. However, the printer 62 is not limited to a tape printer but may be any one of a variety of known printers. Also, templates for a tape printer and those for such a printer as to use ordinary forms may be prepared beforehand, to create labels by switching the printer. Such templates are described below with reference to FIG. 14. FIG. 14 is a diagram of an image of a template according to a variant. As shown in FIG. 14, instead of attaching a plurality of labels to various portions of a DVD case, a template 400 may be prepared which is a jacket type to be folded and fitted into the DVD case. In this case, the template 400 may be thought of as a label set comprised of a plurality of labels arranged on one sheet of paper. Therefore, in printing, labels can be arranged not only on such a jacket type template 400 but also on a variety of shapes of forms.

A label creating apparatus of the invention stores broadcast program information, for example EPG data etc., received by a receiving device into a broadcast program information storing device, specifies with a broadcast program specifying device a broadcast program whose label is to be created based on the stored broadcast program information, and creates a label by using the broadcast program information. In this case, by specifying a plurality of labels as one set beforehand, broadcast program information pieces of one broadcast program are appropriately arranged for the label set, thus creating a label. Therefore, if a plurality of labels is used for one broadcast program in printing because, for example, a lot of data is to be printed or information pieces are to be printed on different labels for different items, it is possible to create a desired number of labels in one-shot operation instead of creating each of the labels.

When a plurality of labels is to be created using elongated tapes having different tape widths, the label creating apparatus of the invention prints information collectively that is, on labels having the same tape width, rather than switching back and forth between different tape widths. In that way printing can be speeded up since it requires a minimum number of tape replacements since a particular tape is not replaced until all the labels having that tape width have been printed.

Since broadcast program information includes at least titles of broadcast programs, the label creating apparatus of the invention can create labels by selecting arbitrary information pieces from the broadcast program information such as, for example, a title, a subtitle, a performer, a broadcast date, and broadcast time, etc.

If a broadcast program is video-recorded by a video-recording device, the label creating apparatus of the invention associates the video-recorded information with stored broadcast program information. Then, if the associated broadcast program information is found by a searching device, information of a broadcast program whose label is to be created is specified from among the associated broadcast program information pieces. The video-recorded information and the broadcast program information are managed in a condition where they are associated with each other, so that it is possible to easily create labels in a batch at any given time, not applying only to the times of video-recording, its reserving, handling of video-recorded information during playback, etc.

Since video-recording lapses of time of broadcast programs are calculated beforehand, for example, to create a label set for a DVD, the label creating apparatus of the invention can avoid creating labels in one label set in excess of an upper limit lapse of time during which information can be video-recorded on that DVD or create label sets as many as the number of DVDs required in video-recording.

Since a template dedicated for a label set is prepared, the label creating apparatus of the invention can more simply create one set of a plurality of labels based on broadcast program information.

The label creating apparatus of the invention enables a user to edit labels once created in accordance with a template and register a result of this edition as another template and, therefore, can use a desired model from the next time onward to create favorite labels with less labor required.

The label creating apparatus of the invention stores broadcast program information, for example EPG data etc., received by the receiving device into the broadcast program information storing device, specifies a broadcast program whose label is to be created based on broadcast program information stored by a controller, and creates a label by using the broadcast program information. In this case, by specifying a plurality of labels as one set beforehand, broadcast program information pieces of one broadcast program are appropriately arranged for the label set, thus creating a label. Therefore, if a plurality of labels is used for one broadcast program in printing because, for example, a lot of data is to be printed or information pieces are to be printed on different labels for different items, it is possible to create a desired number of labels in one-shot operation instead of creating each of the labels.

When a plurality of labels is to be created using an elongated tape and if these labels have different tape widths, the label creating apparatus of the invention prints information collectively on the labels having the same tape width, so that printing can be completed quickly with a minimum required number of replacing the tape.

Since broadcast program information includes at least titles of broadcast programs, the label creating apparatus of the invention can create labels by selecting arbitrary information pieces from the broadcast program information such as, for example, a title, a subtitle, a performer, a broadcast date, and broadcast time, etc.

If a broadcast program is video-recorded by the video-recording device, the label creating apparatus of the invention associates the video-recorded information with stored broadcast program information. Then, if the associated broadcast program information is found by the controller, information of a broadcast program whose label is to be created is specified from among the associated broadcast program information pieces. The video-recorded information and the broadcast program information are managed in a condition where they are associated with each other, so that it is possible to easily create labels in a batch at any given time, not applying only to the times of video-recording, its reserving, handling of video-recorded information during playback, etc.

Since video-recording lapses of time of broadcast programs are calculated beforehand, for example, to create a label set for a DVD, the label creating apparatus of the invention can avoid creating labels in one label set in excess of an upper limit lapse of time during which information can be video-recorded on that DVD or create label sets as many as the number of DVDs required in video-recording.

Since a template dedicated for a label set is prepared, the label creating apparatus of the invention can more simply create one set of a plurality of labels based on broadcast program information.

The label creating apparatus of the invention enables a user to edit labels once created in accordance with a template and register a result of this edition as another template and, therefore, can use a desired model from the next time onward to create favorite labels with less labor required.

A label creating program of the invention stores broadcast program information, for example EPG data etc., received by a receiving step in a broadcast program information storing step, specifies a broadcast program whose label is to be created based on stored broadcast program information by a broadcast program specifying step, and creates a label by using the broadcast program information. In this case, by specifying a plurality of labels as one set beforehand, broadcast program information pieces of one broadcast program are appropriately arranged for the label set, thus creating a label. Therefore, if a plurality of labels is used for one broadcast program in printing because, for example, a lot of data is to be printed or information pieces are to be printed on different labels for different items, it is possible to create a desired number of labels in one-shot operation instead of creating each of the labels.

When a plurality of labels is to be created using an elongated tape and if these labels have different tape widths, the label creating program of the invention prints information collectively on the labels having the same tape width, so that printing can be completed quickly with a minimum required number of replacing the tape.

Since broadcast program information includes at least titles of broadcast programs, the label creating program of the invention can create labels by selecting arbitrary information pieces from the broadcast program information such as, for example, a title, a subtitle, a performer, a broadcast date, and broadcast time, etc.

If a broadcast program is video-recorded by a video-recording step, the label creating program of the invention associates the video-recorded information with stored broadcast program information. Then, if the associated broadcast program information is found by a search step, information of a broadcast program whose label is to be created is specified from among the associated broadcast program information pieces. The video-recorded information and the broadcast program information are managed in a condition where they are associated with each other, so that it is possible to easily create labels in a batch at any given time, not applying only to the times of video-recording, its reserving, handling of video-recorded information during playback, etc.

Since video-recording lapses of time of broadcast programs are calculated beforehand, for example, to create a label set for a DVD, the label creating program of the invention can avoid creating labels in one label set in excess of an upper limit lapse of time during which information can be video-recorded on that DVD or create label sets as many as the number of DVDs required in video-recording.

Since a template dedicated for a label set is prepared, the label creating program of the invention can more simply create one set of a plurality of labels based on broadcast program information.

The label creating program of the invention enables a user to edit labels once created in accordance with a template and register a result of this edition as another template and, therefore, can use a desired model from the next time onward to create favorite labels with less labor required.

Although the invention has been described with reference to exemplary embodiments, it is to be understood that the invention is not limited to the exemplary embodiments or structures. Though (/While) the various elements of the exemplary embodiments are shows in various combinations and configurations, which are exemplary, other combinations and configurations, including more, less, or only a single element, are also within the spirit and scope of the disclosure.

What is claimed is:

1. A label creating apparatus comprising:
a receiving device that receives broadcast program information which relates to broadcast programs;
a broadcast program information storing device that stores the broadcast program information received by the receiving device;
a broadcast program specifying device that specifies, based on a user's selection, the broadcast program whose label is to be created, from among the broadcast programs that correspond to the broadcast program information stored in the broadcast program information storing device;
a broadcast program information acquiring device that acquires the broadcast program information about the broadcast program specified by the broadcast program specifying device from the broadcast program information storing device;
a label set specifying device that specifies a plurality of the labels as one suite of label sets; and
a label creating device that allocates the broadcast program information pieces acquired by the broadcast program information acquiring device to the labels of the label set specified by the label set specifying device and arranging these information pieces into a print region of these labels to thereby create the labels;
wherein, the broadcast program information includes at least titles of the broadcast programs; and
the label creating device creates the labels by arranging information of at least some items of the broadcast program information into print regions of these labels;
the apparatus limber comprising:
a template storing device that stores arrangement information for arranging the broadcast program information pieces in the print region of the labels and a template, which is a print model including modification information of the broadcast program information pieces to be arranged; and
a template selecting device that selects the template to be used, from among the plurality of templates stored in the template storing device, wherein:
the template storing device includes the template for the label set; and
if the template for the label set is selected by the template selecting device, the label set specify device specifies as the label set the plurality of labels included in this template for the label set; and
the apparatus further comprising:
an editing device that edits the labels created by the label creating device; and
a template registering device that registers in the template storing device as the template the print model including the arrangement information and the modification information of the labels edited by the editing device; and
the apparatus further comprising:
a video-recording lapse of time calculating device that calculates a video-recording lapse of time of the selected broadcast program from a broadcast time of this broadcast roc am included in the broadcast program information acquired by the broadcast program information acquiring device; and
a deciding device that decides whether a total of the video-recording lapses of time calculated by the video-recording lapse of time calculating device exceeds a preset upper limit lapse of time;
wherein if the total of the video-recording lapses of time is decided to exceed the preset upper limit lapse of time by the deciding device, the label creating device avoids allocating the broadcast program information to the labels of that label set for the broadcast programs whose video-recording lapses of time exceed the preset upper limit lapse of time.

2. The label creating apparatus according to claim 1, wherein the labels are created to print information on elongated tapes of a plurality of differing widths and further comprising a printing control device that conducts control so that the labels of the plurality of labels created by the label creating device having the same tape width as the width of a tape of the plurality of differing widths on the apparatus may be printed collectively.

3. The label creating apparatus according to claim 1, comprising:
   a video-recording device that video-records the broadcast programs;
   an associating device that associates video-recorded information of the broadcast programs video-recorded by the video-recording device and the broadcast program information of these broadcast programs stored in the broadcast program information storing device with each other; and
   a searching device that searches the broadcast program information storing device in which the broadcast program information pieces are stored, for the broadcast program intimation associated with the video-recorded information, wherein if the broadcast program information associated with the video-recorded information is found by the searching device, the broadcast program specifying device specifies the broadcast program whose label is to be created, from among the broadcast programs that correspond to this associated broadcast program information.

4. The label creating apparatus according to claim 1, wherein the upper limit lapse of time is the upper limit of the total of the video-recording lapses of time of the broadcast programs in the pre-specified on suite of label set.

5. A label creating apparatus comprising:
   a receiving device that receives broadcast program information which relates to broadcast programs;
   a broadcast program information storing device that stores the broadcast program information received by the receiving device; and
   a controller that;
   specifies, based on a user's selection, the broadcast program whose label is to be created, from among the broadcast programs that correspond to the broadcast program information stored in the broadcast program information storing device;
   acquires the broadcast program information about this specified broadcast program from the broadcast program information storing device;
   specifies a plurality of the labels as one suite of label sets; and
   allocates the acquired broadcast program information pieces to the labels of the specified label set and arranges these information pieces into a print region of these labels to thereby create the labels;
   wherein:
   the broadcast program information includes at least titles of the broadcast programs; and
   the controller creates the labels by arranging information of at least some items of the broadcast program information into print regions of these labels;
   the label creating apparatus further comprising:
   a template storing device that includes the templates for the label set and stores arrangement information for arranging the broadcast program information pieces in the print region of the labels and a template, which is a print model including modification information of the broadcast program information pieces to be arranged, wherein the controller;
   selects the template to be used from among the plurality of templates stored in the template storing device; and
   if the template for the label set is selected, specifies as the label set the plurality of labels included in this template for the label set;
   wherein the controller;
   edits the created labels; and
   registers in the template storing device as the template the print model including the arrangement information and the modification information of the edited labels; and
   wherein the controller;
   calculates a video-recording lapse of time of the selected broadcast program from a broadcast time of this broadcast program included in the acquired broadcast program information;
   decides whether a total of the calculated video-recording lapses of time exceeds a preset upper limit lapse of time; and
   if the total of the video-recording lapses of time is decided to exceed the preset upper limit lapse of time, avoids allocating the broadcast program information to the labels of that label set for the broadcast programs whose video-recording lapses of time exceed the preset upper limit lapse of time.

6. The label creating apparatus according to claim 5, wherein:
   the labels are created to print information on elongated tapes of a plurality of differing widths; and
   the controller conducts control so that the labels of the plurality of labels created by the label creating device having the same tape width as the width of a tape of the plurality of differing widths on the apparatus may be printed collectively.

7. The label creating apparatus according to claim 5, further comprising a video-recording device that video-records the broadcast programs, wherein the controller:
   associates video-recorded information of the broadcast programs video-recorded by the video-recording device and the broadcast program information of these broadcast programs stored in the broadcast program information storing device with each other;
   searches the broadcast program information storing device in which the broadcast program information pieces are stored, for the broadcast program information associated with the video-recorded information; and
   if the broadcast program information associated with the video-recorded information is hind, specifies the broadcast program whose label is to be created, from among the broadcast programs that correspond to this associated broadcast program information.

8. The label creating apparatus according to claim 5, wherein the upper limit lapse of time is the upper limit of the total of the video-recording lapses of time of the broadcast programs in the pre-specified one suite of label set.

9. A non-transitory computer-readable medium storing a program which comprises instructions for causing a processor of a label creating apparatus to execute the steps of:
   a receiving step of receiving broadcast program information which relates to broadcast programs;
   a broadcast program information storing step of storing the broadcast program information received in the receiving step;

a broadcast program specifying step of specifying, based on a user's selection, the broadcast program whose label is to be created, from among the broadcast programs that correspond to the broadcast program information stored in the broadcast program information storing step;

a broadcast program information acquiring step of acquiring the broadcast program information about the broadcast program specified in the broadcast program specifying step;

a label set specifying step of specifying a plurality of the labels as one suite of label sets; and a label creating step of allocating the broadcast program information pieces acquired in the broadcast program information acquiring step to the labels of the label set specified in the label set specifying step and arranging these information pieces into a print region of these labels to thereby create the labels;

wherein:

the broadcast program information includes at least titles of the broadcast programs; and the label creating step creates the labels by arranging information of at least some items of the broadcast program information into print regions of these labels;

the program thither comprising:

a template selecting step of selecting the template to be used, from among the template for the label set and the plurality of templates which is a print model including the arrangement information for arranging the broadcast program information pieces in the print region of the labels and modification information of the broadcast program information pieces to be arranged, wherein if the template for the label set is selected by the template selecting step, the label set specifying step specifies as the label set the plurality of labels included in this template for the label set; and the program further comprising:

an editing step of editing the labels created by the label creating step; and a template registering step of registering in the template storing step as the template the print model including the arrangement information and the modification information of the labels edited in the editing step; and the program further comprising:

a video-recording lapse of time calculating step of calculating a video-recording lapse of time of the selected broadcast program from a broadcast time of this broadcast program included in the broadcast program information acquired in the broadcast program information acquiring step; and a deciding step of deciding whether a total of the video-recording lapses of time calculated in the video-recording lapse of time calculating step exceeds a preset upper limit lapse of time, wherein if total of the video-recording lapses of time is decided to exceed the preset upper limit lapse of time by the deciding step, the label creating step avoids allocating the broadcast program information to the labels of that label set for the broadcast programs whose video-recording lapses of time exceed the preset upper limit lapse of time.

10. The program according to claim 9, wherein the labels are created to print information on elongated tapes of a plurality of differing widths, further comprising a priming control step of conducting control so that the labels of the plurality of labels created by the label creating device having the same tape width as the width of a tape of the plurality of differing widths on the apparatus may be printed collectively.

11. The program according to claim 9, comprising:

a video-recording step of video-recording the broadcast programs;

an associating step of associating video-recorded information of the broadcast programs video-recorded in the video-recording step and the broadcast program information of these broadcast programs stored in the broadcast program information storing step with each other; and a searching step of searching the broadcast program information pieces stored in the broadcast program information storing step for the broadcast program information associated with the video-recorded information, wherein if the broadcast program information associated with the video-recorded information is found in the searching step, the broadcast program specifying step specifies the broadcast program whose label is to be created, from among the broadcast programs that correspond to this associated broadcast program information.

12. The program according to claim 9, wherein the upper limit lapse of time is the upper limit of the total of the video-recording lapses of time of the broadcast programs in the pre-specified one suite of label set.

\* \* \* \* \*